Oct. 16, 1956  H. L. GIBSON  2,766,810
APPARATUS FOR SECURING THERMAL-ACTIVATED ADHESIVES
Filed March 12, 1954  3 Sheets-Sheet 1
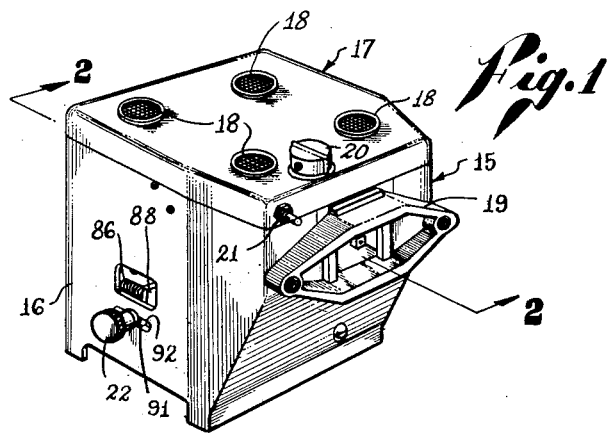
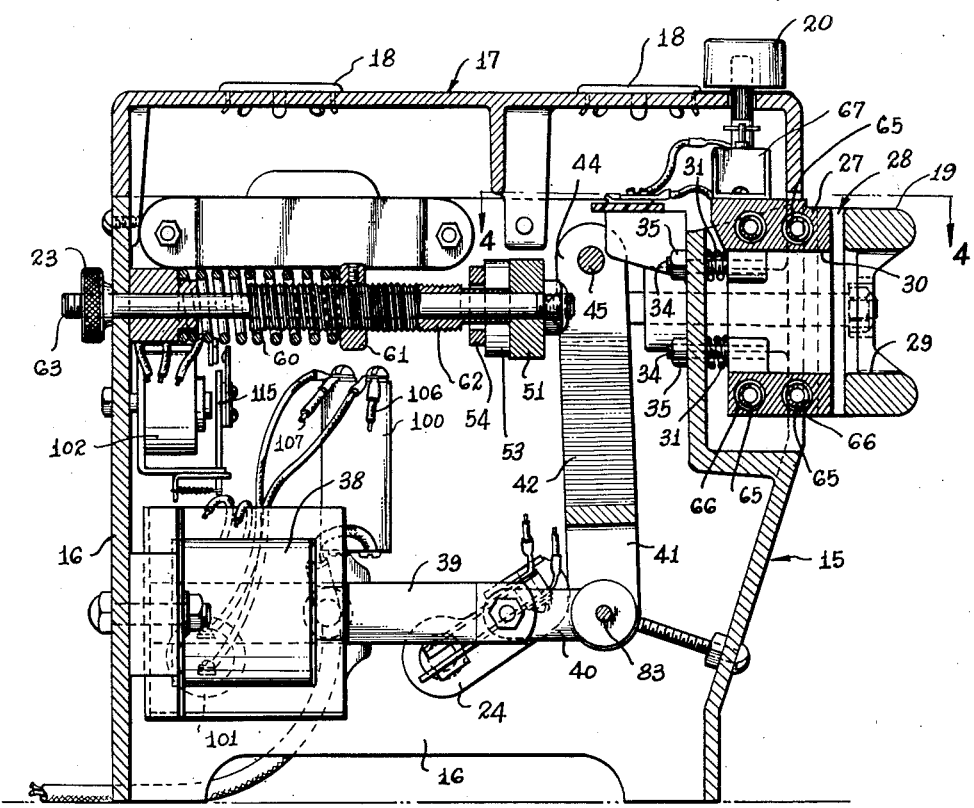
INVENTOR.
HARRY L. GIBSON Oct. 16, 1956 H. L. GIBSON 2,766,810
APPARATUS FOR SECURING THERMAL-ACTIVATED ADHESIVES
Filed March 12, 1954 3 Sheets-Sheet 2
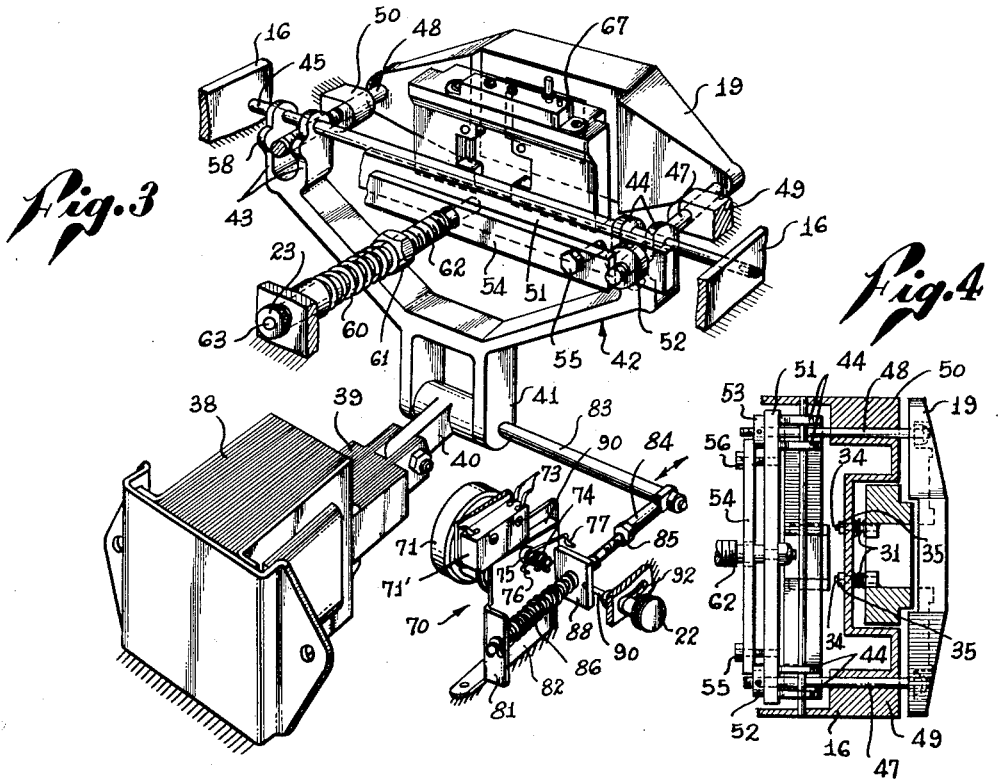
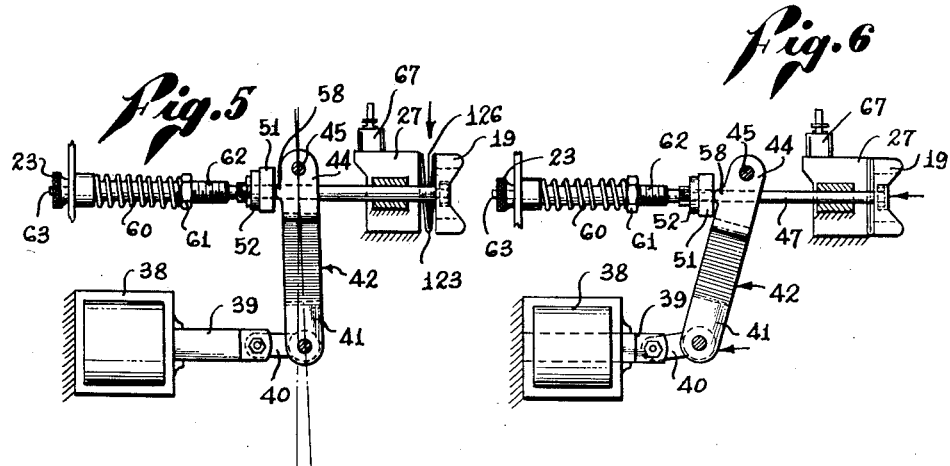
INVENTOR.
HARRY L. GIBSON Oct. 16, 1956 H. L. GIBSON 2,766,810
APPARATUS FOR SECURING THERMAL-ACTIVATED ADHESIVES
Filed March 12, 1954 3 Sheets-Sheet 3
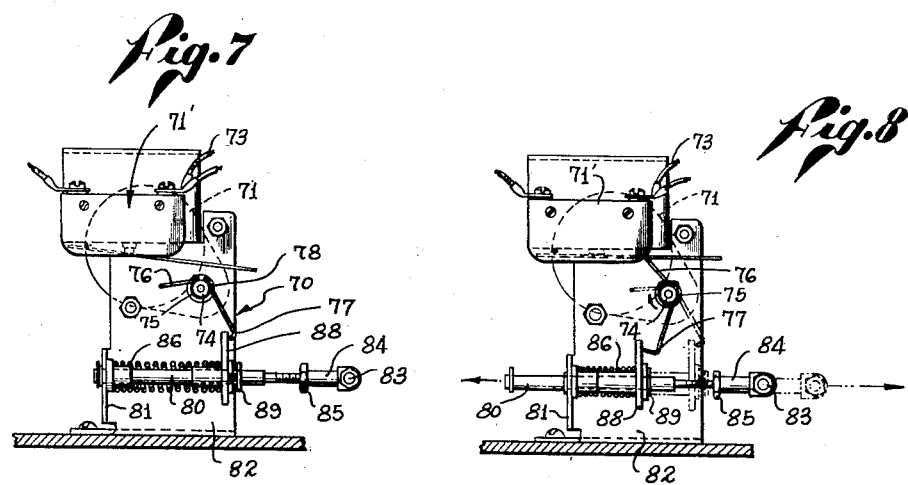
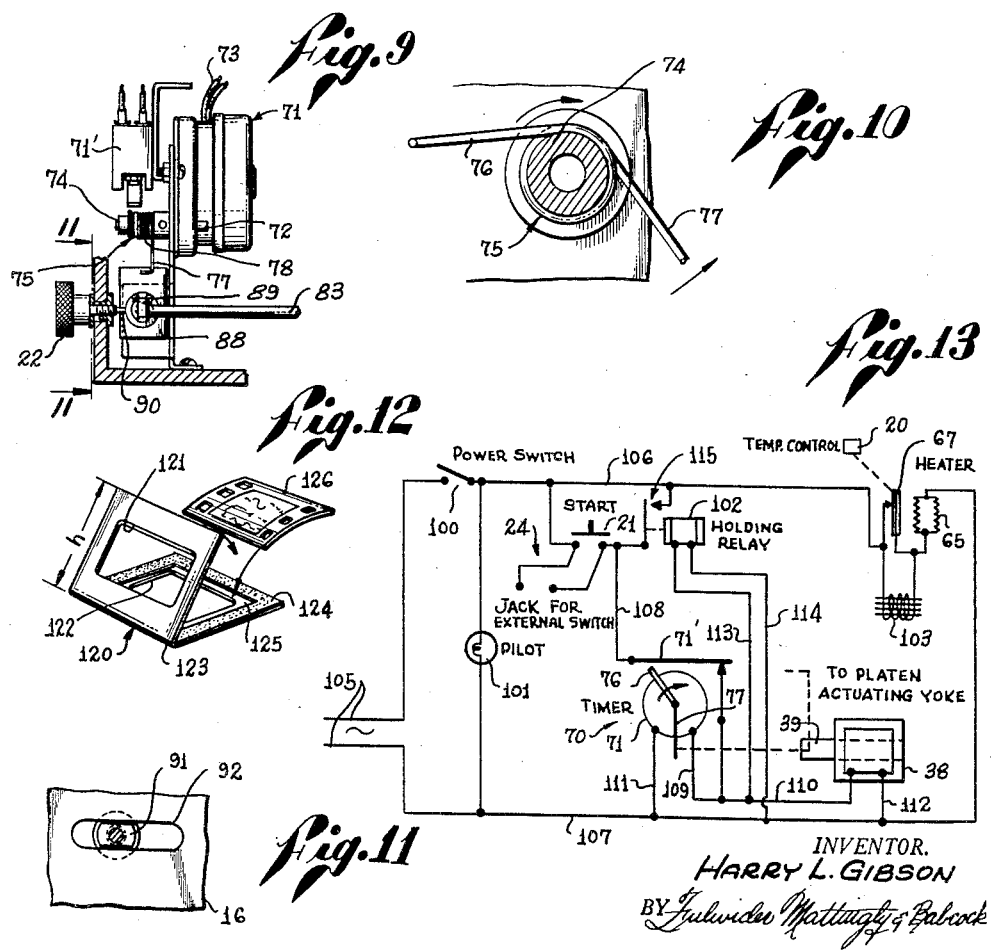
INVENTOR.
HARRY L. GIBSON United States Patent Office 2,766,810
Patented Oct. 16, 1956

2,766,810

APPARATUS FOR SECURING THERMAL-ACTIVATED ADHESIVES

Harry L. Gibson, Los Angeles, Calif.

Application March 12, 1954, Serial No. 415,816

6 Claims. (Cl. 154—42)

This invention relates generally to thermal-activated adhesives, and more particularly to apparatus for enclosing various objects such as photograph documents and the like in a protective binder, or holder, by a heat-sealing operation.

The present invention is illustrated herein as embodied in a heat-sealing unit for binding photo-transparencies in a folder to be used as projection slides. It is to be understood, however, that the principles embodied in the device described herein are not limited to the field of photographic slides, but are applicable to other heat-sealing devices such as those used to enclose passes and cards in a transparent protective folder, and similar devices.

It is customary in the processing and finishing of photographic transparencies, particularly color films, that the finishing laboratory delivers the individual transparencies enclosed in a protective frame, or binder, so that the mounted transparency may be used in a slide projector. In the mounting of transparencies in this manner, it is desirable that the means used to secure the frame, or binding, be capable of rapid operation by relatively unskilled operators, be inexpensive, and be such as to run no substantial risk of harm to the transparency.

Various methods of securing or binding the folder around the transparency have been used in the past, including the use of a folder having a thermal-activated adhesive coating which is secured by the application of heat and pressure to the binder with the transparency enclosed therein. While heat-sealing in this manner may, if properly used, meet the requirements of rapid operation and low cost, devices for applying the heat and pressure have, in the past, had several disadvantages. For one thing, prior devices have not been adequately designed with a view to avoiding damage to the transparency being mounted. As a result, either the transparencies were damaged, or considerable care had to be exercised in order to avoid damage. Color film is particularly susceptible to damage by excessive heat.

Another disadvantage of prior devices is the fact that they have lacked adequate means for assuring a uniform distribution of the pressure applied to the binder, thus resulting in a warped, or buckled, slide.

Still further, prior devices have not been designed with a view to attaining the optimum speed of operation; since considerable care by relatively skilled operators had to be exercised in order to avoid damage to the transparencies or the production of unsatisfactory slides.

Accordingly, it is a major object of the present invention to provide a heat-sealing unit for mounting photo-transparencies which avoids the foregoing difficulties encountered in connection with prior devices.

More particularly, it is another object of the invention to provide a heat-sealing unit for the purpose described, in which the application of heat and pressure is accomplished in an automatically timed and controlled cycle.

Still another object of the invention is to provide a unit of the class described in which the transparency, together with the binder, may be inserted readily into the unit, and will be held in proper alignment prior to the application of the heat and pressure, and in which the finished slide will automatically drop out of the unit when the heat-sealing cycle is completed.

A further object of the invention is to provide an accurate, easily adjusted, automatically resetting timer for controlling the heat-sealing cycle.

A still further object of the invention is to provide a thermostatic control system for maintaining the proper sealing temperature without substantial variations over the period of time that the device is used.

Yet another object of the invention is to provide a heat-sealing unit of the class described in which the sealing pressure is uniformly applied to the frame, whereby to produce flat, non-buckling slides.

The foregoing and additional objects and advantages of the invention will be apparent from the following detailed description of a presently preferred embodiment thereof, consideration being given likewise to the attached drawings in which:

Figure 1 is a front-perspective view of a heat-sealing unit embodying the present invention;

Figure 2 is an enlarged elevational section taken on the line 2—2 in Figure 1;

Figure 3 is a perspective, semi-schematic view of the working parts contained in the device illustrated in Figures 1 and 2;

Figure 4 is a fragmentary horizontal section taken on the line 4—4 in Figure 2;

Figures 5 and 6 are operational diagrams illustrating the application of pressure during the heat-sealing cycle, the parts depicted being certain of those shown in Figure 3;

Figures 7 and 8 are operational diagrams illustrating the operation and resetting of the automatic timer during the heat-sealing cycle, the parts depicted being certain of those shown in Figure 3;

Figure 9 is an end elevational view of the timer parts shown in Figures 7 and 8;

Figure 10 is an enlarged fragmentary view of a portion of the timer mechanism illustrated in Figures 7, 8, and 9;

Figure 11 is an elevational section taken on the line 11 in Figure 9;

Figure 12 is a perspective view of a slide folder and transparency prior to assembly in the apparatus illustrated in the preceding drawings; and Figure 13 is a wiring diagram showing the connection of the electrical components of the device shown in Figures 1 and 2.

Throughout the drawings I have indicated the heat-sealing unit embodying the present invention by the reference character 15. Referring particularly to Figure 1, it will be seen that externally the heat-sealing unit 15 comprises a boxlike housing 16 having a removable top cover 17 provided with ventilating openings 18 and having projecting from the front thereof a movable platen member 19. A thermostat control knob 20 for regulating the sealing temperature, is accessible at the top of the unit, a starting switch button 21 is mounted in the front edge of the cover 17, and an adjustment knob 22 is accessible at one side of the housing 16. As shown in Figure 2, an adjusting knob 23 is accessible at the rear of the housing 16, the purpose of the knob 23 being to adjust the degree of opening of the movable platen member 19 as will be later described. A jack 24 by which an external starting switch may be connected to the unit, is mounted in the side of the housing 16 opposite the timer control knob 22.

Referring to Figure 2 for a description of the internal construction of the device it will be seen that the movable platen 19 is spaced outwardly from a fixed platen 27, a vertical receiving slot 28 being provided between the two platens 19 and 27. It will be noted that both the fixed platen 27 and the movable platen 19 are formed with rectangular openings therein indicated at 29 and 30, whereby the pressure contact between the platens 19 and 27 when the same are closed, as will be described hereinafter, is confined to a frame area surrounding the aligned rectangular openings 29—30. The size and shape of the openings 29—30 is substantially the same as the exposed frame area of a finished slide.

While the inner platen 27 is termed herein the "fixed" platen, it is actually supported on a floating suspension including four compression springs 31 anchored against the bottom of a recessed wall portion 33 in the front of the housing 16.

The fixed platen 27 is further supported and held in place by four studs 34 mounted therein passing through the compression springs 31, and clearance holes in the recessed wall portion 33 having nuts 35 threaded on to the rearward end thereof.

Thus it will be seen that the fixed platen 27, when engaged by the closing movement of the movable platen 19, may yield inwardly slightly by compression of the springs 31. The floating mounting just described assures that the pressure between the platens 19 and 27 will be uniformly distributed throughout the frame area surrounding the rectangular openings 29 and 30.

Mechanism for closing the movable platen 19 is best seen in Figures 3 through 6. The prime mover of the platen-closing mechanism is a solenoid 38 having an armature 39 which is drawn inwardly (to the left in Figures 3, 5, and 6) whenever the solenoid 38 is energized. The outer end of the armature 39 is connected by a connecting rod 40 to the lower end 41 of a pivotal yoke 42, the upper ends of which are bifurcated as shown at 43 and 44, and are mounted to a fixed fulcrum bar 45, which is mounted between the opposite sides of the housing 16. As can be seen best in Figure 4, the movable platen 19 is supported on a pair of reciprocable tension rods 47 and 48, slidably held in bearings 49 and 50, formed in the housing 16. The rearward ends of the tension rods 47 and 48 are jointed by a transverse tie bar 51 to which they are secured by capstan nuts 52 and 53 which, in turn, are locked by a transverse lock bar 54, secured by bolts 55 and 56 to the tie bar 51.

As can be seen best in Figures 5 and 6, the yoke 42 is formed with rearwardly extending cam-like projections 58, which engage the front surface of the tie bar 51 so that when the solenoid 38 is energized, and the yoke 42 is swung rearwardly about the fulcrum bar 45, the cam projections 58 engage the tie bar 51, move the same rearwardly, and through the tension bars 47 and 48 cause the movable platen 19 to close against the fixed platen 27.

When the solenoid 38 is de-energized, the movable platen 19 is pushed outwardly to open the slot 28, the opening movement being accomplished by a compression spring 60, anchored against the rear of the housing 16 and thrusting forwardly against an adjustment nut 61 threaded onto a sleeve 62 which, in turn, centrally abuts the tie bar 51 as can be seen best in Figure 2. A stop rod 63 extends through the back of the housing 16, the compression spring 60, the sleeve 62, and is threaded at its forward end into the tie bar 51. The adjustment nut 23 is threaded onto the stop rod outside the housing 16 and limits the forward motion of the tie bar-platen assembly, thus limiting the degree to which the slot 28 is opened by the compression spring 60.

The fixed platen 27 is heated by four heating elements 65, carried in closely fitting transverse bores 66 in the fixed platen 27 as can be seen best in Figure 2. A thermostatic sensing unit 67 which may be of the conventional bimetallic type, is secured to the top of the fixed platen in heat transfer contact therewith, and operates, in the conventional manner to open and close a switch when the temperature of the platen 27 respectively rises above, or falls below a predetermined temperature. The sensing unit 67 may be adjusted by the conventional control knob 20 to regulate the temperature at which the switch (not shown) is opened or closed by the sensing unit. Further details of the operation of the thermostatic control will be discussed in connection with a later description of the circuit shown in Figure 13.

As previously stated, a timing unit 70 is provided for automatically timing the heat-sealing cycle during which the platen 19 is closed against the fixed platen 27. The details of the timing unit and its relationship to the remaining parts of the structure are best seen in Figures 3 and 7 through 10. The time-determining element of the timer is a self-starting synchronous clock motor 71 having an output shaft 72 rotated at a constant predetermined speed in a clock-wise direction as seen in Figures 7, 8, and 10, whenever the clock motor 71 is energized through the leads 73. Mounted on the shaft 72 for rotation therewith, is a smooth cylindrical hub member 74, carrying on its periphery a spring ratchet member 75 having a switch actuating arm 76 and a reset arm 77 extending tangentially from the periphery of the hub member 74. The spring ratchet member 75 comprises a helical spring having several turns 78 wrapped snugly around the smooth periphery of the hub member 74, and terminating in the aforesaid tangentially extending arms 76 and 77.

As can be seen best in Figure 10, rotation of the hub member 74 in a clockwise direction with respect to the arm 76, tends to wrap the spring turns 78 more tightly against the hub 74, if the arm 76 is restrained in its rotation. On the other hand, counter-clockwise rotation of the reset arm 77 is in a direction to tend to unwrap the ratchet member 75 from the hub member 74, thus releasing the frictional engagement of the spring turn 78 with the surface of the hub member 74. The ratchet member 75 is retained in place on the hub member 74 by means of a conventional snap ring 79.

As can be seen best in Figure 3, a reset mechanism including a reciprocable rod 80 carried in an aperture flange 81 on the base 82 of the timer unit 70, is linked to the platen actuating yoke 42 by means of a projecting bar 83 connected, crank-fashion, to the outer end of the reciprocable bar 80 by a length-adjusting fixture 84 threaded onto the bar 80 and locked in place with a lock nut 85. When the solenoid 38 is energized to rock the actuating yoke 42 rearwardly, the just-described linkage causes the rod 80 to move to the left from the position shown in Figure 7 to that shown in Figure 8. Release of the solenoid tension returns the rod 80 to its position shown in Figure 7.

Mounted on the rod 80 intermediate its ends, is a timer reset flange 88 which abuts a conventional snap ring 89 carried in a groove in the rod 80, the flange 88 being held against the snap ring 89, by the pressure of a compression spring 86 carried on the rod 80. When the solenoid 38 is in a de-energized condition, and the rod 80 is thus in the righthand limit of its motion as illustrated in Figure 7, the rightward motion of the reset flange 88 urged by the spring 86, is limited by a stop pin 90 carried on the inner end of the time adjustment knob 22. The shaft of the time adjustment knob 22 is threaded into a nut 91 in a slot 92 in the housing 16. Thus it will be seen that by loosening the knob 22, the same can be slid back and forth in the slot 92 to place the stop pin 90 at various positions along the path traveled by the flange 88.

When the solenoid is energized, and the rod 80 is moved to the left as shown in Figure 8, the snap ring 89 lifts the flange 88 away from the stop pin 90, and moves it to the lefthand limit of its motion as shown in Figure 8.

As will be described later herein, the energization of the solenoid 38 simultaneously energizes the clock motor 71 whereupon the hub members 74 immediately begins to rotate carrying the timer arm 76 around to a position where it engages and operates a timer switch 71', which in turn operates to interrupt the circuit to the solenoid and to the clock, thus terminating the heat-sealing cycle.

When, upon release of the solenoid 38, the platen actuating yoke 42 swings back to its rest position, the reciprocating rod 80 is also returned to the righthand limit of its motion. This, in turn, carries the reset flange 88 to the right to its position against the stop pin 90. In traveling to the right in the manner just described, the flange member 88 engages the reset arm 77 which, as above described, releases the frictional engagement of the ratchet member 75 with the hub member 74, and swings the member 75 to a new starting position as shown in Figure 7. The starting position, it will be realized, is determined by the position of the stop pin 90 which limits the rightward motion of the reset flange 88.

Circuit

For a description of the circuit interconnecting the above-described elements, reference is made to Figure 13. In addition to the previously described elements, the electric components include a power switch 100, a pilot light 101, a holding relay 102, and an inductance 103.

Referring to Figure 13, it will be seen that an alternating current power supply for the sealing unit 15 is delivered through leads 105, and when the power switch 100 is closed, two supply busses 106 and 107 are energized, this fact being indicated by the lighting of the pilot light 101.

The heat-sealing cycle is initiated by closing the normally open starting switch 21, which completes a circuit from the power bus 106 through a lead 108, through the normally closed timing switch 71', and through leads 109 and 110 to one terminal of each of the clock motor 71 and the solenoid 38, respectively. The other terminals of the last-named members are connected through leads 111 and 112, respectively, to the other power supply bus 107. Thus, closing of the starting switch 21 starts the operation of the clock motor 71, and also energizes the solenoid 38.

It will be noted that by reason of leads 113 and 114, closure of the starting switch also energizes the coil of a holding relay 102, closing the normally open contact 115 thereof, which contact being across the starting switch 21 maintains the circuit to the clock motor 71 and the solenoid 38 even after release of the starting switch 21. When the clock motor has rotated the timer arm 76 to a position to open the timer switch 71', the circuit to the timer motor and to the solenoid 38 is broken, thus actuating the reset mechanism in the manner previously described, and releasing the platens. At the same time, the circuit to the holding relay is broken, returning the contacts 115 to their normally open position and placing the unit in readiness for the next operation.

As shown in Figure 13, the heaters 65 are connected in parallel across the main power busses 106 and 107. The thermostat 67 and the inductance 103 are in parallel with each other and in series with the heaters 65. Thus it will be seen that when the thermostat switch is closed, the inductance 103 is shunted out of the circuit and the full voltage across the busses 106 and 107 is imposed on the heaters 65. When the temperature rises to the point where the switch 67 opens, however, the inductance 103 is placed in series with the heaters 65, thus dropping the voltage and the thermal output of the heaters. The value of the inductance 103 is so selected that the voltage across the heaters, when the thermostat switch 67 is open, is just slightly less than sufficient to bring the platens up to the desired temperature, whereas the full voltage across the busses 106 and 107 is just slightly more than sufficient to maintain the desired temperature.

The foregoing thermal control circuit has the advantage that a relatively low voltage appears across the contacts of the thermostatic switch 67 and thus deterioration of the switch contacts is avoided. The arrangement has the further advantage that the drop in voltage across the heaters is accomplished not by dissipating heat elsewhere in a pure resistance, but by the use of an inductive load instead.

The arrangement just described, coupled with the thermal inertia due to the mass of the platen 27, is such as to maintain the temperature of the latter substantially uniform so long as power is applied to the unit, and irrespective of the frequency of operation.

Operation

The appearance of the conventional transparency prior to sealing the same in the sealing unit 15 is illustrated in Figure 12 wherein the unsealed binder is also shown. The binder 120 is preformed with the framing apertures 121 and 112, is scored to facilitate folding along the fold line 123, and is coated over a predetermined area 124 surrounding the aperture 122 with a thermosensitive adhesive. The coating 124 of adhesive has substantial thickness and is so confined as to leave a rectangular uncoated space 125 surrounding the frame area 122, the space 125 being slightly larger than the dimensions of the transparency 126.

In employing the heat-sealing unit 115 to seal binders 120 around transparencies 126, the binder-receiving slot 28 is first adjusted by means of the adjustment nut 23 to a space several times the folded thickness of the binder 120. The master switch 100 is closed, and the platen 27 is allowed to come up to the desired sealing temperature. A binder 120 is then folded with the transparency 126 resting in the space 125 wherein it is retained, centered, and aligned by the slight thickness of the adhesive 124 which surrounds it. The binder with the enclosed transparency is then placed in the slot 28 with the folded edge 123 down and with the side of the binder 120 bearing the adhesive coating 124 toward the heated platen 127. The natural curl of the transparency 126 and the slight resiliency of the binder 120 is sufficient, at this stage, to prevent the binder 120 from dropping out the bottom of the slot 28. Furthermore, the vertical dimension of the binder 120 (indicated at H in Figure 12) is substantially the same as the vertical length of the slot 28 whereby the binder may be aligned with the apertures 29 and 30 in the platens by pressing the same downwardly into the slot until the uppermost edge of the binder 120 is aligned with the top of the slot 28.

With the binder in the aforesaid position, the starting switch 21 is closed momentarily, whereupon the platens close and are held closed during the automatically timed sealing cycle, at the end of which, the platens automatically open. The adhesive 124, when heated, causes the binder 120 to be sealed shut in a flat condition, with the transparency 126 retained in the space 125, which, as previously mentioned contains no adhesive. This arrangement has the advantage, in addition to aligning the transparency as previously mentioned, that the transparency 126 does not adhere to the binder and thus is not buckled or warped as is the case when the same is actually glued, or otherwise firmly attached to the binder.

When the platens open after the completion of the heat sealing cycle, the closed and sealed binder 120 with the transparency 126 mounted therein now being substantially flat, drops out the bottom of the slot 28, leaving the latter in readiness to receive the next binder.

Thus it will be seen that the foregoing device provides means for rapidly, accurately, and harmlessly sealing transparencies and other objects in a thermal adhesive binder. The speed of operation is limited only by the time necessary to place the transparencies or other objects to be sealed in the binders, and by the relatively short time necessary to activate the adhesive 124. In this connection, it will be noted that since the heat is applied simultaneously over the entire area to be sealed, and since the heating time is accurately maintained, the temperature can be relatively high and thus the time required to seal the binder is much shorter than in the conventional case where heat is manually applied successively to different parts of the article to be sealed.

While the device shown herein is fully capable of achieving the objects and providing the advantages hereinbefore stated, it will be realized that modifications are possible without departure from the spirit of the invention. Therefore, I do not mean to be limited to the forms shown and described, but rather to the scope of the appended claims.

I claim:

1. In the sealing apparatus of the class described: a floating platen resiliently mounted to yieldably move into alignment with a mating operating platen; an operating platen mating with said floating platen and mounted to move relative thereto in a direction normal to the plane of said mating; reciprocable electrical motor means mechanically connected to said operating platen and adapted, when energized, to move it relative to said floating platen; timer means for controlling the period of actuation of said motor means; and cam means reciprocably movable with said motor means to reset said timer means upon return of said motor means to de-actuated position.

2. In sealing apparatus of the class described: a floating platen resiliently mounted to yieldably move into alignment with a mating operating platen; an operating platen mating with said floating platen and mounted to move relative thereto in a direction normal to the plane of said mating; reciprocable electrical motor means mechanically connected to said operating platen and adapted when energized, to move it toward said floating platen and close on an object to be sealed between said platens, forcing said floating platen into alignment with the sealing face of said operating platen; electric timer means having a switch actuating member adapted when said timer is energized to move at a uniform rate in a predetermined path; a normally closed control switch in said path; a source of electric power; a starting switch; and electric circuit means electrically interconnecting said source and motor means through said control switch and starting switch, and electrically interconnecting said source and timer through said starting switch, whereby closing said starting switch closes, and holds closed said platen, and at a predetermined elapsed time thereafter, said timer actuates said control switch to interrupt the circuit motor means and permit opening of said platen.

3. A heat sealer which includes: a floating platen resiliently mounted to yieldably move into alignment with a mating operating platen; an operating platen mating with said floating platen and mounted to move relative thereto in a direction normal to the plane of said mating; reciprocable electrical motor means mechanically connected to said operating platen and adapted, when energized, to move it toward said floating platen and close on an object to be sealed between said platens, forcing said floating platen into alignment with the sealing face of said operating platen; an electric heater mounted in heat transfer relationship with one of said platens, whereby to heat the same; a thermostat circuit connected to said heater, said circuit including an inductance in parallel with said heater, and a thermo-actuated switch connected to shunt said inductance and adapted to open upon increase of temperature of said platen above a predetermined temperature, whereby to reduce the voltage applied across said heater; and timer means interconnected and adapted to actuate said motor means for a predetermined period.

4. A heat sealer of the class described which includes: a floating platen resiliently supported on a plurality of spring members, and having a sealing surface; an operating platen having a sealing surface mating with that of said floating platen, said operating platen being reciprocably mounted to move said sealing surfaces toward each other; an electric heater mounted in heat transfer relationship with one of said platens, whereby to heat the same; a reciprocable electrical motor means for moving said operating platen toward said floating platen; spring means connected to said operating platen to urge the same to a normally open position, wherein said platens are spaced apart to receive an object to be sealed therebetween; a rotary timer carrying a ratchet means; a stop switch opened by said ratchet means to interrupt the sealing action of said heat sealer; a timer resetting means reciprocable with said electric motor means and engaging said ratchet means to reset it to starting position upon the release of said motor means to a starting position.

5. A heat sealer of the class described which includes: a floating platen resiliently mounted to yieldably move into alignment with a mating operating platen; an operating platen mating with said floating platen and mounted to move reciprocably to and from engagement with the mating surface of said floating platen; reciprocable electric motor means mechanically connected to said operating platen, and adapted, when energized, to move it relative to said floating platen; a rotary timer started when said operating platen moves into sealing engagement with said floating platen; a stop switch for stopping the heat sealing operation and causing said operating platen to move away from said floating platen; a stop switch actuating means releasably coupled to said rotary timer, and adapted to operate said stop switch when rotated into engagement therewith by said rotary timer; a timer resetting means reciprocable with said electric motor means, and engaging said stop switch actuating means to rotate it on its releasable coupling to a starting position, when said operating platen moves away from sealing engagement with said floating platen; and an electric heater mounted in heat transfer relationship with one of said platens.

6. A heat sealer of the class described which includes: a floating platen frame adapted to bear on the periphery of an object to be sealed between said floating platen and a mating operating platen; a plurality of spring means supporting said floating platen back of the sealing face thereof and adapted to be resiliently compressed during the sealing operation; an operating platen mating with said floating platen and mounted to move reciprocably to and from engagement with the mating surface of said floating platen; reciprocable electric motor means mechanically connected to said operating platen, and adapted, when energized, to move it relative to said floating platen; a rotary timer started when said operating platen moves into sealing engagement with said floating platen; a stop switch for stopping the heat sealing operation and causing said operating platen to move away from said floating platen; a stop switch actuating means releasably coupled to said rotary timer, and adapted to operate said stop switch when rotated into engagement therewith by said rotary timer; a timer resetting means reciprocable with said electric motor means, and engaging said stop switch actuating means to rotate it on its releasable coupling to a starting position, when said operating platen moves away from sealing engagement with said floating platen; and an electric heater mounted in heat transfer relationship with one of said platens.

References Cited in the file of this patent

UNITED STATES PATENTS

| | | |
|---|---|---|
| 2,305,010 | Kenney et al. | Dec. 15, 1942 |
| 2,460,460 | Langer | Feb. 1, 1949 |